A. P. LAUTERMAN.
Packing for Stuffing-Boxes.
No. 167,104. Patented Aug. 24, 1875.
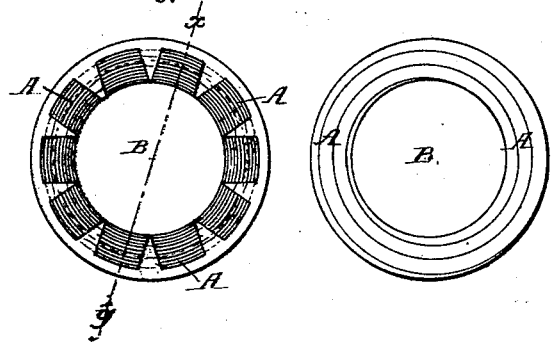
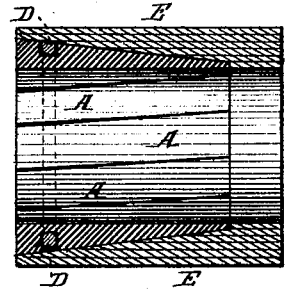
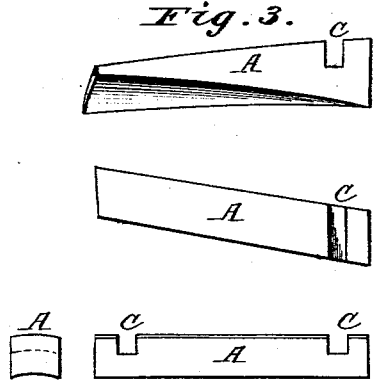
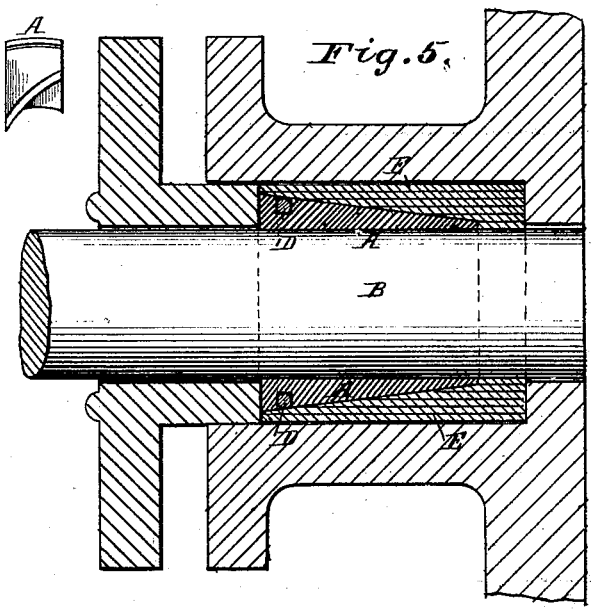
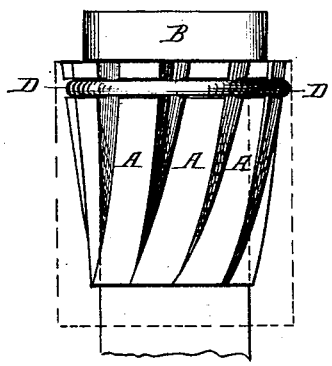
Attest:
H. L. Perrine.
Jo. S. Coombs
Inventor.
A. P. Lauterman
By James L. Norris,
atty.

UNITED STATES PATENT OFFICE.

ABRAHAM P. LAUTERMAN, OF CHICAGO, ILLINOIS.

IMPROVEMENT IN PACKINGS FOR STUFFING-BOXES.

Specification forming part of Letters Patent No. 167,104, dated August 24, 1875; application filed July 24, 1875.

*To all whom it may concern:*

Be it known that I, ABRAHAM P. LAUTERMAN, of Chicago, in the county of Cook and State of Illinois, have invented certain new and useful Improvements in Packing for Journal-Boxes, &c., of which the following is a specification:

This invention relates to certain improvements in the packing or lining for journal-boxes and other similar parts of machinery, the object being to secure a packing or lining combining durability and cheapness, and which can be readily constructed and applied by persons of ordinary skill.

In the drawing, Figure 1 represents a transverse section of my improved packing. Fig. 2 represents a longitudinal section of the same. Fig. 3 represents detached views of the sections composing the packing; Fig. 4, a view of the sections in place around a journal, and Fig. 5 a sectional view of the same.

The letter A represents a series of straight or spirally shaped metallic wedges around the journal or shaft B of any kind of machinery, the inner faces of the same being curved to fit the exterior of said shaft or journal. The said sections or wedges are formed of any anti-friction alloy, such as Babbitt's metal or the like, or of any suitable variety of wood. Near either end of the same, in their outer faces, are formed a series of grooves, C, which form a continuous recess when the wedges are in place for the reception of a binding-ring, D, by which they are held together around the piston or valve rod during the process of constructing the packing previous to the application of the flexible or elastic covering. E represents the elastic covering, which is composed of rubber cloth or other suitable material, wrapped in successive layers around the metallic packing-wedges. The interstices between the wedges are filled with loose scraps of rubber or other elastic material, the whole being confined and held in place by the elastic or flexible outer covering.

In applying my improved packing the sections or wedges are first arranged spirally around the shaft or journal, and confined in place thereon by the circular wire which sets into the recess formed by the grooves near the ends of the wedges or sections. The interstices between said wedges or sections are then filled and packed with scraps of rubber or other elastic or flexible packing material, after which the whole is securely covered by winding around the same successive layers of rubber cloth, or other elastic or flexible material, after which the whole is secured in the stuffing-box in the usual manner.

The packing as thus formed is simple in its construction and easily applied, besides being extremely durable, and is attended with so little friction that the nuts of the stuffing-box may be easily turned with the fingers without the use of tools, when the packing is required to be tightened.

Having thus described my invention, what I claim, and desire to secure by Letters Patent, is—

1. The combination of the spiral wedge-shaped sections, adapted to fit around the journal or shaft, the flexible or elastic covering surrounding the same, and the journal-box within which the whole is confined, substantially as described.

2. The combination of the spiral wedge-shaped packing-sections, the grooves at their ends, and binding-ring for holding them in place, and the outer covering of elastic material wound in successive layers around the same, substantially as described.

3. The combination of the spiral wedge-shaped packing-sections, the elastic packing in the interstices between the same, and the elastic or flexible outer covering, substantially as described.

In testimony that I claim the foregoing I have hereunto set my hand in the presence of the subscribing witnesses.

A. P. LAUTERMAN.

Witnesses:
H. M. GARLICK,
FRANKLIN WARE.